(12) United States Patent
Lambert et al.

(10) Patent No.: US 7,473,815 B2
(45) Date of Patent: Jan. 6, 2009

(54) PROCESS FOR REMOVAL OF CATALYST RESIDUES FROM POLY-α-OLEFINS

(75) Inventors: Timothy L. Lambert, Waterbury, CT (US); Werner A. Thuring, Elmira (CA)

(73) Assignee: Crompton Corporation, Middlebury, CT (US)

( * ) Notice: Subject to any disclaimer, the term of this patent is extended or adjusted under 35 U.S.C. 154(b) by 1023 days.

(21) Appl. No.: 10/712,829

(22) Filed: Nov. 12, 2003

(65) Prior Publication Data

US 2005/0101761 A1 May 12, 2005

(51) Int. Cl.
*C07C 7/12* (2006.01)

(52) U.S. Cl. .................. 585/809; 585/820; 585/833; 585/852; 585/853

(58) Field of Classification Search .......... 208/115, 208/135, 140, 251 R, 262.1; 524/437, 445; 526/82, 84, 133; 528/503; 585/809, 820, 585/833, 852, 853, 85
See application file for complete search history.

(56) References Cited

U.S. PATENT DOCUMENTS

| | | | | |
|---|---|---|---|---|
| 3,567,795 A * | 3/1971 | Ishikawa et al. | ............. | 585/809 |
| 3,904,498 A | 9/1975 | Hesse et al. | ............... | 204/157.1 |
| 4,028,485 A | 6/1977 | Poloso et al. | ............... | 528/486 |
| 4,122,126 A | 10/1978 | Taniyasu et al. | ............. | 260/677 |
| 4,200,528 A | 4/1980 | Cassella et al. | ............... | 210/49 |
| 4,207,152 A | 6/1980 | Kadija et al. | ................... | 204/98 |
| 4,256,577 A | 3/1981 | Cassella et al. | ............. | 210/738 |
| 4,284,762 A | 8/1981 | Miyata et al. | ............... | 528/485 |
| 4,338,477 A * | 7/1982 | Moody et al. | ............... | 585/520 |
| 4,347,353 A | 8/1982 | Miyata et al. | ............... | 528/485 |
| 4,379,882 A | 4/1983 | Miyata | ...................... | 524/436 |
| 4,476,297 A | 10/1984 | Kablitz et al. | ............... | 528/486 |
| 4,547,620 A | 10/1985 | Miyata et al. | ............... | 585/852 |
| 4,634,744 A * | 1/1987 | Hwang et al. | .................. | 526/84 |
| 4,642,408 A | 2/1987 | Chauvin et al. | ............. | 585/836 |
| 4,721,818 A | 1/1988 | Harper et al. | ............... | 568/120 |
| 4,877,906 A | 10/1989 | Harper | ....................... | 568/621 |
| 4,952,304 A * | 8/1990 | Timms | .................... | 208/251 R |
| 4,992,529 A | 2/1991 | Hoxmeier | ................... | 528/486 |
| 5,093,509 A | 3/1992 | Meyer et al. | .................. | 556/57 |
| 5,104,972 A | 4/1992 | Madgavkar et al. | ......... | 528/488 |
| 5,196,630 A | 3/1993 | Agrawal et al. | ............. | 585/860 |
| 5,712,214 A * | 1/1998 | Huang et al. | .................. | 502/37 |
| 6,180,730 B1 | 1/2001 | Sibtain et al. | .................. | 526/84 |
| 6,274,777 B1 | 8/2001 | Gray et al. | ................... | 568/792 |
| 2003/0162918 A1 * | 8/2003 | Wettling et al. | ............. | 526/133 |

* cited by examiner

*Primary Examiner*—Glenn Caldarola
*Assistant Examiner*—Randy Boyer
(74) *Attorney, Agent, or Firm*—Jaimes Sher

(57) ABSTRACT

A method is disclosed for reducing levels of residual halogen and Group IIIb metals in a crude poly(α-olefin) polymerized in the presence of a catalyst comprising the halogen and Group IIIb metals, wherein the method comprises:
  A) washing the crude poly(α-olefin) with water;
  B) separating the aqueous and organic phases;
  C) then adding an adsorbent selected from the group consisting of magnesium silicates, calcium silicates, aluminum silicates, aluminum oxides, and clays to the organic phase to form a slurry;
  D) heating the slurry under reduced pressure at a temperature of at least about 180° C. for at least about thirty minutes; and then
  E) separating the adsorbent from the slurry.

18 Claims, No Drawings

PROCESS FOR REMOVAL OF CATALYST RESIDUES FROM POLY-α-OLEFINS

BACKGROUND OF THE INVENTION

1. Field of the Invention

The present invention relates to a method for separating contaminants from olefin polymers. More particularly, the present invention relates to a method for removing residual catalyst components from an olefin polymerization product obtained in the presence of the catalyst.

2. Description of Related Art

The insufficient removal of catalysts and, in particular, their metallic and halogen components from liquid olefin polymer results in many undesirable problems. For example, the presence of catalyst residues may cause discoloration of the resulting polymerization products, the generation of hydrogen halide gas owing to the thermal degradation of the catalyst, the degradation or decomposition of the organic compounds owing to structural change during subsequent distillation, the poisoning by halogen contaminants of hydrogenation catalysts during subsequent polymer treatment, and the like. It is therefore desirable to remove the catalyst residues from the polymerization product as fully as possible prior to subsequent treatment and/or use of such products.

U.S. Pat. No. 3,904,498 discloses a process for removing residues of a catalyst comprising an aluminum compound of the formula $AlR_nX_{3-n}$ wherein R is alkyl, X is halogen, and n is a whole or fractional number from 0 to 3 inclusive, from an organic solution containing the residues that comprises the steps of admixing an aqueous solution of an alkali or alkaline earth metal hydroxide with the organic solution to precipitate the catalyst residues as hydroxides or salts and separating precipitated catalyst residues from the resultant mixture, which is characterized by:

a. admixing the aqueous solution in an amount insufficient to form a second liquid phase in the resultant mixture, and forming a non-aqueous suspension of directly separable precipitated catalyst residues; and b. separating the precipitated catalyst residues in the solid phase directly from the resultant mixture.

U.S. Pat. No. 4,028,485 discloses a process for removing hydrogenation catalyst residue from solutions of hydrogenated olefins or olefinic polymers containing them comprising treating such solutions with a non-aqueous acid followed by neutralization with an anhydrous base and filtration.

U.S. Pat. No. 4,122,126 discloses a method for removing an aluminum halide or its complex catalyst from a polymerization product comprising the steps of adding to the polymerization product an aprotic polar solvent in an amount of 1.0 through 6.0 mol per one mol of the aluminum halide in the catalyst present in the product and sufficiently mixing them at a temperature of 70° through 150° C., and then, filtering the mixture at a temperature of 70° through 150° C. The addition of the aprotic polar solvent facilitates the separation of the catalyst from the polymerization product.

U.S. Pat. No. 4,200,528 discloses that amorphous, hydrated magnesium silicate is effective in reducing the concentration of various metal ions in aqueous solutions or effluent streams. Both mono- and multi-valent ions can be treated in this manner, thereby providing a method of preventing release of metal ions to the environment. The method is said to be especially efficient in removal of chrome values from effluents generated in chrome tanning operations. Efficient adsorption of the chrome requires that the pH of the effluent-magnesium silicate slurry be adjusted to or maintained at a value between 5.3 and 9.8. The chrome value may be recovered from the magnesium silicate by acidification of the complex.

U.S. Pat. No. 4,207,152 discloses the removal of cationic contaminants from an alkali metal chloride brine by a process that comprises contacting the brine with solid particles of a magnesium-containing silicate having a mole ratio of silicon to magnesium of at least about 1:1. The cationic contaminants in the brine adhere to the magnesium-containing silicate particles and the concentration of the cationic contaminants is thereby reduced. A purified brine is obtained by removing the magnesium-containing silicate having cationic contaminants adhering thereto. Elements of Groups VIII, IV, and II can be removed from brines used in electrolytic processes, such as the production of chlorine and alkali metal hydroxides or alkali metal chlorates.

U.S. Pat. No. 4,256,577 discloses that the almost complete elimination of metal ions in aqueous effluents can be effected by treating the effluent with a base and then adding amorphous, hydrated magnesium silicate. This sequential process is said to allow metal ion concentration to be reduced to less than 0.1 part per million while using a fairly small amount of amorphous hydrated magnesium silicate.

U.S. Pat. Nos. 4,284,762 and 4,347,353 disclose an improvement in a method for inhibiting the corrosion-causing tendency and coloration of an olefin polymer or copolymer containing a halogen component by incorporating about 0.01 to about 5 parts by weight of a hydrotalcite; wherein the improvement comprises mixing an olefin polymer or copolymer containing a halogen component attributed to a polymerization catalyst and/or to post-halogenation, with a hydrotalcite of the formula $$Mg_{1-x}Al_x(OH)_2A^{n-}{}_{x/n}.mH_2O$$

wherein $0<x\leq0.5$, m is a positive number, and $A^{n-}$ represents an anion having a valence of n, or a product resulting from the surface-coating of the hydrotalcite with an anionic surface-active agent, the hydrotalcite having (i) a BET specific surface area of not more than 30 m²/g, (ii) an average secondary particle size of not more than 5 microns, and preferably (iii) a crystallite size, in the <003> direction determined by an X-ray diffraction method, of at least 600 Å.

U.S. Pat. No. 4,379,882 discloses a polyolefin composition consisting essentially of (a) 100 parts by weight of a polyolefin containing halogens derived from a polymerization catalyst and/or attributed to the after-halogenation of the polymer, and (b) about 0.001 to about 10 parts by weight of an aluminum-magnesium hydroxide represented by the following formula $$Mg_{1-x}Al_x(OH)_{2+x}.mH_2O$$

wherein x is a positive number represented by $0<x\leq0.5$ and m is a positive number represented by $0<m\leq2$, and having a BET specific surface area of no more than about 40 m²/g. A method for inactivating the halogen in a halogen-containing polyolefin is also disclosed.

U.S. Pat. No. 4,476,297 discloses that the content of titanium and light metal halides and aluminum compounds in polyolefins emanating from the catalyst system can be considerably reduced by treatment with a higher, preferably branched, aliphatic monocarboxylic acid having 6 to 10 carbon atoms.

U.S. Pat. No. 4,547,620 discloses a process for removing a halogen component from a halogen-containing organic compound, which comprises contacting an organic compound in the liquid state which is produced by using a halogen containing catalyst selected from the group consisting of Friedel-Crafts catalysts and Ziegler catalysts and contains the halogen component derived from the catalyst, with a hydrotalcite compound represented by the formula

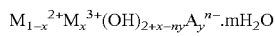

wherein $M^{2+}$ represents a divalent metal ion selected from the group consisting of $Mg^{2+}$, $Zn^{2+}$, $Ca^{2+}$, $Ni^{2+}$, $Co^{2+}$, $Mn^{2+}$ and $Cu^{2+}$, $M^{3+}$ represents a trivalent metal ion selected from the group consisting of $Al^{3+}$, $Fe^{3+}$ and $Cr^{3+}$, $A^{n-}$ represents an anion having a valence of n selected from the group consisting of $HCO_3^-$, $OH^-$ and $CO_3^{2-}$, and x, y and m are each a positive number and satisfy the following conditions $0.1<x<0.5$, $0.1<y<0.4$, $0 \leq m<1$, under non-aqueous conditions, and separating the treated organic compound from the hydrotalcite compound.

U.S. Pat. No. 4,642,408 discloses the removal of nickel, aluminum and chlorine derivatives, which remain dissolved in olefin oligomers after oligomerization in the presence of a catalyst comprising such derivatives, by treatment with: oxygen or a gas containing oxygen, anhydrous ammonia, and a solution of an alkali metal hydroxide.

U.S. Pat. No. 4,721,818 discloses a method for removing double metal cyanide complex catalyst residue from polyols using alkali metal hydrides. In one embodiment, the catalyst residue is converted into an insoluble ionic metal species and separated by filtration using magnesium or aluminum silicate to facilitate separation.

U.S. Pat. No. 4,877,906 discloses a method for removing double metal cyanide complex catalyst from polyether polyols which uses alkali metal compounds and phosphorous compounds to precipitate the residual catalyst, which may then be removed by filtration. In one embodiment, a propylene oxide polyol is treated with sodium metal dispsersion, capped with ethylene oxide, treated with magnesium silicate, and then filtered to remove at least a portion of the catalyst. Substantially complete catalyst removal is then achieved by treating the polyol with hypophosphorous or phosphorous acid to precipitate the remaining solubilized double metal cyanide complex catalyst residue, neutralizing the excess acid with magnesium silicate, and filtering.

4,992,529 discloses a method for separating metal residues from a polymer wherein a solution or suspension of the polymer is contacted with an aqueous solution containing one or more inorganic acids in the presence of a monocarboxylic acid containing from about 6 to about 20 carbon atoms. The polymer solution or suspension will be contacted with an oxidizing agent either prior to or simultaneously with the contacting with the aqueous inorganic acid solution. The inorganic acid is, preferably, a mineral acid and the monocarboxylic acid is preferably a branched chain alkanoic acid having from about 6 to about 10 carbon atoms. When a monocarboxylic acid is used in combination with the inorganic acid, the amount of metal removed from the polymer is said to be increased and the amount of the aqueous phase containing ionized metal entrained in the organic phase reduced.

U.S. Pat. No. 5,093,509 discloses the separation of an epoxidation reaction product formed by the molybdenum catalyzed reaction of propylene with tertiary butyl hydroperoxide to provide propylene oxide and tertiary butyl alcohol by distillation into a propylene fraction, a propylene oxide fraction, a tertiary butyl alcohol fraction and a heavy liquid distillation fraction composed primarily of tertiary butyl hydroperoxide, tertiary butyl alcohol, dissolved molybdenum catalyst, and impurities including lower aliphatic $C_1$-$C_4$ carboxylic acids, and the dissolved molybdenum content of the heavy distillation fraction is adjusted to about 300 to 500 ppm of dissolved molybdenum, if necessary, by treatment with a precipitating agent and contacted with a solid adsorbent consisting essentially of a synthetic, porous, high surface area amorphous magnesium silicate.

U.S. Pat. No. 5,104,972 discloses a process comprising the steps of contacting a Group VIII metal hydrogenation catalyst residue containing polymer solution with a silicate, and recovering a polymer solution comprising less than 5 ppm by weight, based on the solution, of the Group VIII metal. In a preferred embodiment, the silicate is calcium silicate, magnesium silicate or diatomaceous earth.

U.S. Pat. No. 5,196,630 discloses a simplified method for the removal of halogen containing catalytic residues from olefin polymerization products. A quaternary ammonium salt is employed as a treating agent to facilitate removal of greater than 95% of catalytic residues in a single caustic or water wash with less than 15 minutes of settling time required after the wash.

U.S. Pat. No. 6,180,730 discloses the use of a particulate deactivator to pacify halogen-containing catalyst residues from a medium pressure solution polymerization process. The deactivator is added post-reactor preferably in the form of a suspension. The particulate deactivator may also be used in conjunction with a secondary, soluble deactivator.

U.S. Pat. No. 6,274,777 discloses a method for removing boron from a boron trifluoride-catalyzed polyalkyl hydroxyaromatic reaction product which comprises: (a) diluting the polyalkyl hydroxyaromatic reaction product with an inert solvent to give a polyalkyl hydroxyaromatic reaction product concentration in the range of about 40 to about 80 weight percent; (b) filtering the diluted polyalkyl hydroxyaromatic reaction product in the presence of a filter aid in combination with (1) magnesium silicate, (2) water or (3) a mixture of magnesium silicate and water; wherein the water is present during filtration at a concentration of about 100 to 1,500 ppm, based on the diluted polyalkyl hydroxyaromatic reaction product; with the proviso that when water is used in the absence of magnesium silicate, the filter aid is diatomaceous earth; and (c) recovering a filtrate containing the diluted polyalkyl hydroxyaromatic reaction product having less than about 10 ppm of boron present.

The disclosures of the foregoing are incorporated herein by reference in their entirety.

SUMMARY OF THE INVENTION

Metallic (aluminum) brominated polymerization catalyst residues persist in poly-alpha-olefins (PAO's) and must be removed prior to selling the finished product. These residues are problematic in the final processing steps of the PAO because they can plug filters, cause corrosion, and poison the hydrogenation catalysts used to eliminate residual unsaturation during finishing of the PAO. Residual bromine from the polymerization catalyst is particularly damaging to the hydrogenation catalyst efficiency.

In the finishing of PAO, considerable amounts of money are spent on hydrogenation catalyst and hydrogen usage. Much of this cost is a direct result of the high residual polymerization catalyst levels in the unfinished product, since the residual metal and halogen from the polymerization catalyst render higher hydrogenation catalyst loadings necessary during hydrogenation of the crude PAO product. The residual halogen also necessitates the continuous purging of by-product hydrogen halide from the reactor during hydrogenation of the crude product. This purging accounts for most of the total hydrogen raw material usage. Further, the polymerization catalyst residues cause operational problems by plugging and fouling downstream filters and may cause corrosion of downstream operating equipment owing to their acidic nature and because halogens are known to be agents of stress crack corrosion. Reduction of the polymerization catalyst residues upstream of the filters and hydrogenation operation would result in reduced cost by decreasing raw material usage and improving operating efficiency.

It has now been discovered that the efficiency of removal of residual halogen, e.g., bromine, from the PAO by adsorbents is particularly sensitive to where in the process the removal step is conducted. The temperature and adsorbent levels are also important parameters.

More particularly, the present invention is directed to a method for reducing levels of residual halogen and Group IIIb metals in a crude poly(α-olefin) polymerized in the presence of a catalyst comprising the halogen and Group IIIb metals, wherein the method comprises:

A) washing the crude poly(α-olefin) with water;
B) separating the aqueous and organic phases;
C) then adding an adsorbent selected from the group consisting of magnesium silicates, calcium silicates, aluminum silicates, aluminum oxides, and clays to the organic phase to form a slurry;
D) heating the slurry under reduced pressure at a temperature of at least about 180° C. for at least about thirty minutes; and then
E) separating the adsorbent from the slurry.

DESCRIPTION OF THE PREFERRED EMBODIMENTS

As noted above, the present invention is directed to a method for reducing levels of residual halogen and Group IIIb metals in a crude poly(α-olefin) polymerized in the presence of a catalyst comprising the halogen and Group IIIb metals, wherein the method comprises:

A) washing the crude poly(α-olefin) with water;
B) separating the aqueous and organic phases;
C) then adding an adsorbent selected from the group consisting of magnesium silicates, calcium silicates, aluminum silicates, aluminum oxides, and clays to the organic phase to form a slurry;
D) heating the slurry under reduced pressure at a temperature of at least about 180° C. for at least about thirty minutes; and then
E) separating the adsorbent from the slurry.

As employed herein, the term "Group IIIb metals" comprises boron, aluminum, gallium, indium, and thallium. Aluminum is the metal with the highest probability of being a contaminant in crude poly(α-olefin) and is thus the preferred metal for removal by the process of the present invention.

The term "halogen" is used herein in its usual sense of comprising fluorine, chlorine, bromine, iodine, and astatine. Chlorine and bromine are preferred, bromine the more preferred.

When five percent by weight of magnesium silicate (based on the PAO) was added to an unfinished PAO product prior to an aqueous extraction of the PAO, it reduced the residual aluminum from 890 ppm to less than 7 ppm, while the bromine was reduced from 12,000 ppm to 1385 ppm.

In a similar example, 5 wt % magnesium silicate reduced the aluminum from 874 ppm to less than 7 ppm and the bromine from 11,600 ppm to 2749 ppm. In still another example, 2.5% magnesium silicate reduced the aluminum from 874 ppm to less 7 ppm and the bromine from 11,600 ppm to 2538 ppm. Each of these examples shows an effective removal of residual aluminum to below the detection limit of the instrumental methods used to detect it; however, the residual bromine from the polymerization catalyst, while greatly reduced, is still high enough to poison the hydrogenation catalyst used in the further purification of the PAO product.

It would be highly desirable to reduce the residual bromine to as low a level as possible in order to mitigate poisoning of the hydrogenation catalyst. It has been found, however, that treatment of the crude PAO with adsorbent prior to washing with water is sufficient to mitigate problems associated with the fouling of downstream filters, but is insufficient to mitigate the poisoning of the hydrogenation catalyst or problems associated with halogen-induced stress crack corrosion. This is because all of the inorganic metallic halides are removed but organic halides remain in the poly(α-olefin).

In accordance with the present invention, crude PAO is treated with an adsorbent, preferably magnesium silicate, after first being treated with a water wash and subsequent separation of the PAO and water phases, whereby PAO product having greatly reduced bromine and aluminum levels is obtained after stripping off the residual water and filtering the magnesium silicate from the product. The adsorbent is preferably employed at a level of at least about 0.4 eq. metal/eq. halogen.

As shown below in Table 1, in Example 21, by the process of the present invention, the aluminum was reduced from a nominal 30 ppm to less than 1 ppm while the bromine was reduced from 6415 ppm to 105 ppm by treatment with magnesium silicate (1.2 eq. Mg/eq. halogen) under vacuum for 3 hours at 200° C. The vacuum should be at least about 50 mm Hg, but is preferably 10 mm Hg or less. In Example 12, the Al was similarly reduced from a nominal 30 ppm to less than 1 ppm while the bromine was reduced from 5024 ppm to 92 ppm by treatment with magnesium silicate (0.78 eq. Mg/eq. halogen) under vacuum for 3 hours at 200° C. In Examples 17 and 19, the bromine was reduced from 6415 ppm to 81 ppm by treatment with magnesium silicate (0.8 eq. Mg/eq. halogen) under vacuum for 3 hours at 200° C. and from 6415 ppm to 70 ppm by treatment with magnesium silicate (0.8 eq. Mg/eq. halogen) under vacuum at 200° C. for 1.5 hours.

Stripping and filtering crude PAO in the absence of magnesium silicate provides a PAO product with a nominal 1650 ppm bromine and 30 ppm aluminum.

The temperature and adsorbent usage levels are important factors in the practice of the present invention and are summarized in Table 1 below. It can be seen that magnesium silicate usage levels should be at least about 0.4 eq. Mg/eq. halogen of the PAO product being treated, preferably from about 0.78 to about 1.2 eq. Mg/eq. halogen, and that stripping temperatures under reduced pressure of at least about 160° C., preferably from about 160 to about 300° C., but more preferably from about 180 to about 220° C., are required to achieve residual bromine levels no greater than 170 ppm, preferably no greater than about 120 ppm, more preferably no greater than 110 ppm.

In addition to magnesium silicate, adsorbents useful in the practice of the present invention are amphoteric in nature and include magnesium silicates, calcium silicates, aluminum silicates, aluminum oxides, clays, and the like. The preferred adsorbent is magnesium silicate. As can be seen from Example 24, the adsorbents can be used in conjunction with each other.

In a typical experiment, PAO is charged to a reactor affixed with agitation and inert gas pad and washed with 5% water. The aqueous and organic phases are allowed to separate and the aqueous phase is drained off. The required amount of magnesium silicate is then added and the reactor heated to at least 180° C. under vacuum and held at stripping temperature for the required time in order to react the residual halogen and to dry the product. The magnesium silicate is removed by filtration to provide a product ready for hydrogenation.

More specifically, PAO is agitated with 5% water at 95° C. for 30 minutes. Agitation is stopped and the batch is allowed to settle/separate for 20 minutes. The lower aqueous phase is removed rom the bottom of the reactor. Magnesium silicate (0.8 eq. Mg/eq. halogen) is added to the batch with agitation at 95° C. the batch is heated to 200° C. at atmospheric pressure. A vacuum of 10 mm Hg is applied for 90 minutes and the batch is then cooled to 180° C. and filtered over 45μ filter cloth to give the product with 70 ppm residual Br and <0.1 ppm Al (Example 19).

The results of the working Examples are shown in Table 1.

TABLE 1

| Example | Invention | Comparative | Magnesium silicate usage | | Vacuum strip temp. °C. | Vacuum strip time min. | Bromine, ppm | Aluminum ppm |
|---|---|---|---|---|---|---|---|---|
| | | | A* | B* | | | | |
| 1 | | x | 0.16 | 0.1 | 160 | 90 | 1210 | 1 |
| 2 | | x | 0.16 | 0.1 | 160 | 180 | 1098 | 1 |
| 3 | | x | 0.16 | 0.1 | 200 | 90 | 687 | 1.1 |
| 4 | | x | 0.16 | 0.1 | 200 | 180 | 551 | 1.1 |
| 5 | | x | 0.30 | 0.25 | 200 | 90 | 688 | 3.1 |
| 6 | | x | 0.30 | 0.25 | 200 | 180 | 599 | 3.1 |
| 7 | | x | 0.40 | 0.37 | 200 | 30 | 383 | <0.1 |
| 8 | | x | 0.40 | 0.37 | 200 | 180 | 771 | <0.1 |
| 9 | | x | 0.40 | 0.37 | 200 | 90 | 428 | <0.1 |
| 10 | | x | 0.60 | 0.56 | 200 | 105 | 628 | <0.1 |
| 11 | x | | 0.78 | 0.5 | 200 | 90 | 169 | 0.1 |
| 12 | x | | 0.78 | 0.5 | 200 | 180 | 92 | 0.1 |
| 13 | | x | 0.78 | 0.5 | 160 | 90 | 731 | 0.4 |
| 14 | | x | 0.78 | 0.5 | 160 | 180 | 476 | 0.4 |
| 15 | | x | 0.78 | 0.5 | 160 | 90 | 881 | 0.4 |
| 16 | | x | 0.78 | 0.5 | 160 | 180 | 792 | 0.4 |
| 17 | x | | 0.80 | 0.74 | 200 | 180 | 81 | <0.1 |
| 18 | x | | 0.80 | 0.74 | 200 | 30 | 118 | <0.1 |
| 19 | x | | 0.80 | 0.74 | 200 | 90 | 70 | <0.1 |
| 20 | | x | 1.2 | 1.0 | 200 | 90 | 266 | 0.1 |
| 21 | x | | 1.2 | 1.0 | 200 | 180 | 105 | 0.1 |
| 22 | x | | 1.0 | — | 180 | 90 | 206 | N.M.*** |
| 23 | x | | 4.3 | — | 180 | 90 | 132 | N.M. |
| 24 | x | | 1/1** | — | 180 | 90 | 167 | N.M. |

*A is eq. Mg/eq. Br; B is % (PAO).
**1/1 means a mixture of 1.0 eq. magnesium silicate and 1.0 eq. aluminum oxide.
***N.M. is "not measured".

In view of the many changes and modifications that can be made without departing from principles underlying the invention, reference should be made to the appended claims for an understanding of the scope of the protection to be afforded the invention.

What is claimed is:

1. A method of reducing levels of residual halogen to from 70 to 206 parts per million and reducing levels of residual Group IIIb metals to 0.1 or less parts per million in a liquid poly(α-olefin) polymerized in the presence of a catalyst comprising the halogen and Group IIIb metals, wherein the method comprises:
    A) washing the liquid poly (α-olefin) with water;
    B) separating the aqueous and organic phases;
    C) then adding from 0.78-1.0 eq. metal/eq. halogen of an adsorbent selected from the group consisting of magnesium silicates, calcium silicates, aluminum silicates, aluminum oxides, and clays to the organic phase to form a slurry;
    D) heating the slurry under a vacuum of at least 50 mmHg and at a temperature of at least about 180° C. for at least about thirty minutes; and then
    E) separating the adsorbent from the slurry.

2. The method of claim 1 wherein the halogen is selected from the group consisting of chlorine, bromine, and mixtures thereof.

3. The method of claim 2 wherein the halogen is bromine.

4. The method of claim 1 wherein the Group IIIb metal is aluminum.

5. The method of claim 1 wherein the adsorbent is a magnesium silicate.

6. The method of claim 1 wherein the heating step is continued for at least about 90 minutes.

7. The method of claim 1 wherein the heating step is continued for at least about 180 minutes.

8. The method of claim 1 wherein the adsorbent is separated from the slurry by filtration.

9. A method of reducing levels of residual halogen to about 105 parts per million and reducing levels of residual Group IIIb metals to 0.1 or less parts per million in a liquid poly(α-olefin) polymerized in the presence of a catalyst comprising the halogen and Group IIIb metals, wherein the method comprises:
    A) washing the liquid poly (α-olefin) with water;
    B) separating the aqueous and organic phases;
    C) then adding about 1.2 eq. metal/eq. halogen of an adsorbent selected from the group consisting of magnesium silicates, calcium silicates, aluminum silicates, aluminum oxides, and clays to the organic phase to form a slurry;

D) heating the slurry under a vacuum of at least 50 mmHg and at a temperature of at least about 180° C. for about 180 minutes; and
E) separating the adsorbent from the slurry.

10. A method of reducing levels of residual halogen to from 70 to 206 parts per million and reducing levels of residual Group IIIb metals to 0.1 or less parts per million in a liquid poly(α-olefin) polymerized in the presence of a catalyst comprising the halogen and Group IIIb metals, wherein the method comprises:
A) washing the liquid poly (α-olefin) with water;
B) separating the aqueous and organic phases;
C) then adding from 0.78-1.0 eq. metal/eq. halogen of an adsorbent selected from the group consisting of magnesium silicates, calcium silicates, and aluminum silicates to the organic phase to form a slurry;
D) heating the slurry under a vacuum of at least 50 mmHg and at a temperature of at least about 180° C. for at least about thirty minutes; and then
E) separating the adsorbent from the slurry.

11. The method of claim 10 wherein the halogen is selected from the group consisting of chlorine, bromine, and mixtures thereof.

12. The method of claim 11 wherein the halogen is bromine.

13. The method of claim 10 wherein the Group IIIb metal is aluminum.

14. The method of claim 10 wherein the adsorbent is a magnesium silicate.

15. The method of claim 10 wherein the heating step is continued for at least about 90 minutes.

16. The method of claim 10 wherein the heating step is continued for at least about 180 minutes.

17. The method of claim 10 wherein the adsorbent is separated from the slurry by filtration.

18. The method of claim 13 wherein the adsorbent is a magnesium silicate.

* * * * *